United States Patent
Seitz et al.

(10) Patent No.: US 7,047,954 B2
(45) Date of Patent: May 23, 2006

(54) METHOD FOR CARRYING OUT AN INTERNAL EXHAUST GAS RECIRCULATION TO THE COMBUSTION CHAMBER OF AN INTERNAL COMBUSTION ENGINE

(75) Inventors: Hans Felix Seitz, Graz (AT); Gabor Hrauda, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/494,755

(22) PCT Filed: Oct. 24, 2002

(86) PCT No.: PCT/AT02/00301

§ 371 (c)(1),
(2), (4) Date: Oct. 26, 2004

(87) PCT Pub. No.: WO03/040540

PCT Pub. Date: May 15, 2003

(65) Prior Publication Data

US 2005/0076890 A1   Apr. 14, 2005

(30) Foreign Application Priority Data

Nov. 6, 2001   (AT) ............................. GM855/2001

(51) Int. Cl.
*F02M 25/07*   (2006.01)
(52) U.S. Cl. ................................. 123/568.14
(58) Field of Classification Search .......... 123/568.11, 123/568.14, 58.8, 90.11, 90.15, 90.16, 90.17
See application file for complete search history.

(56) References Cited

U.S. PATENT DOCUMENTS

| | | | | |
|---|---|---|---|---|
| 4,722,315 | A | * | 2/1988 | Pickel ................... 123/568.14 |
| 5,224,460 | A | * | 7/1993 | Havstad et al. ......... 123/568.14 |
| 6,543,411 | B1 | * | 4/2003 | Raab et al. ............ 123/568.14 |
| 6,932,063 | B1 | * | 8/2005 | Hu ........................ 123/568.14 |

FOREIGN PATENT DOCUMENTS

| | | |
|---|---|---|
| AT | 3207 | 11/1999 |
| DE | 1242044 | 6/1967 |
| DE | 3437330 | 4/1986 |
| EP | 1054143 | 2/2000 |

OTHER PUBLICATIONS

Patent Abstracts of Japan, vol. 1997, No. 07, Jul. 31, 1997 of JP 09-088646, Mar. 31, 1997, of Hamai Yuji et al., entitled "Engine Control Device".

* cited by examiner

*Primary Examiner*—Willis R. Wolfe, Jr.

(74) *Attorney, Agent, or Firm*—Dykema Gossett PLLC

(57) ABSTRACT

The invention relates to a method for carrying out an internal exhaust gas recirculation to the combustion chamber of a Diesel internal combustion engine according to which the inlet valve is briefly opened during the exhaust cycle. According to the invention, the start ($H_{v1}$) of the inlet valve approach stroke ($H_{Ev}$) lies in the range of 180° to 210° crank angle (KW) after the upper dead center (OTZ) of ignition, thereby improving emission performance in the low speed range and in the medium and high speed range.

10 Claims, 1 Drawing Sheet

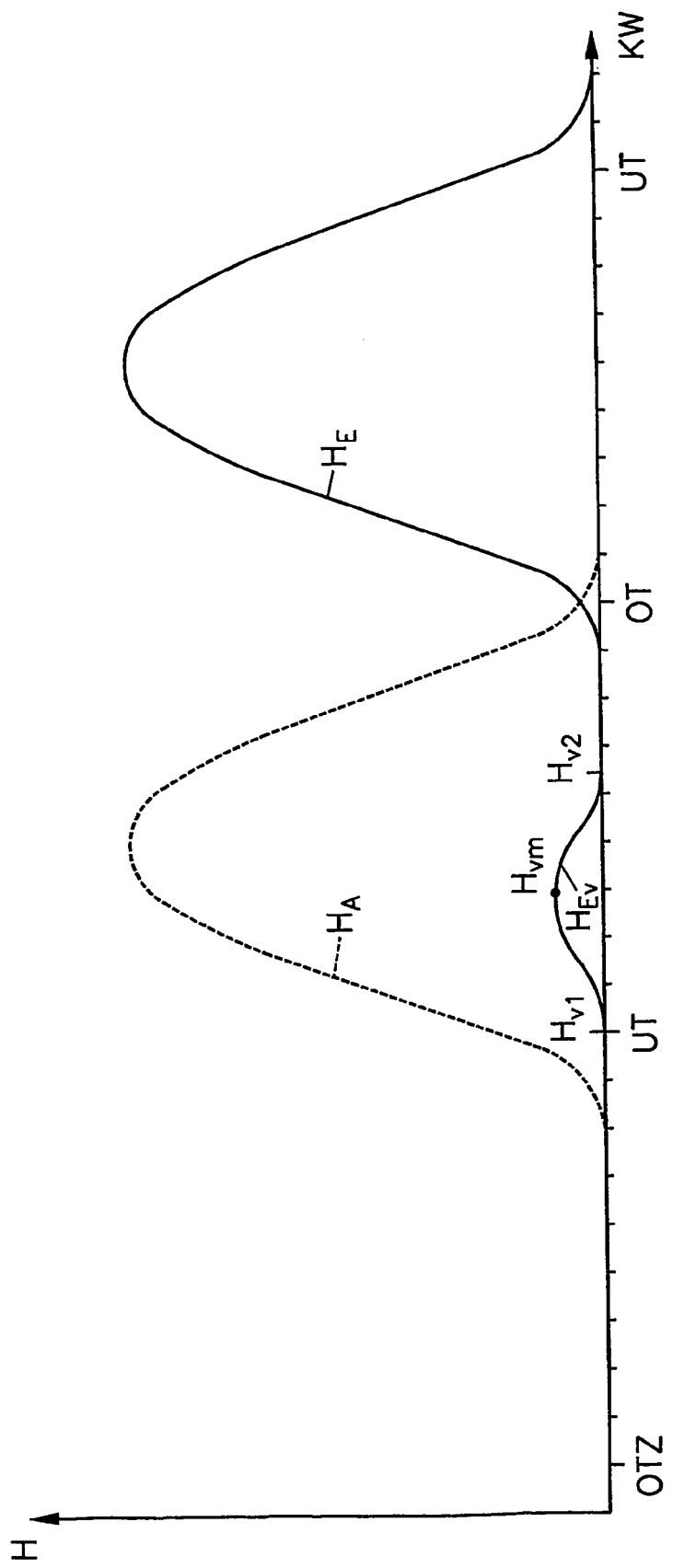

METHOD FOR CARRYING OUT AN INTERNAL EXHAUST GAS RECIRCULATION TO THE COMBUSTION CHAMBER OF AN INTERNAL COMBUSTION ENGINE

BACKGROUND OF THE INVENTION

1. Field of the Invention

The invention relates to a method for performing an internal exhaust gas recirculation into the combustion chamber of an internal combustion engine, especially a diesel engine, with an intake valve stroke of at least one intake valve being performed during an exhaust cycle.

2. The Prior Art

In order to take the more stringent exhaust emission legislations into account and to realise the best possible fuel mileages, it is increasingly necessary in diesel engines to admix a certain quantity of exhaust gas to the fresh air taken in by the engine. The $NO_x$ emissions of the engine are thus reduced to the quantity demanded by the legislator while maintaining a favourable utilisation of the fuel.

In the case of supercharged utility vehicle diesel engines, the mean pressure in the exhaust manifold (depending on the engine size and the speed band) is lower than on the intake side over a wide speed and load margin, which would obstruct exhaust gas recirculation via a simple connection line between the exhaust manifold and the intake side of the engine.

The internal exhaust gas recirculation offers the possibility, independent of the pressure conditions in the intake and exhaust section, to recirculate gas back to the cylinder.

An internal combustion engine with internal exhaust gas recirculation into the combustion chamber is known from DE 34 37 330 A1, in which the intake valve is opened for a short time during the exhaust cycle, with the opening occurring not earlier than 30° crank angle after the lower dead centre prior to gas exchange and the maximum stroke being between 15% and 30% of the maximum intake valve stroke. Shortly before the upper dead centre of the gas exchange there is still a minimum opening of the intake valve which remains until the start of the intake stroke, whereas the exhaust valve closes before the upper dead centre of the gas exchange. In this way, however, it is only possible to realise optimal exhaust gas recirculation quantities in the partial-load range, while the quantity of recirculated exhaust gas decreases towards full load and no exhaust gas is recirculated any more at full load. The minimal opening of the intake valve during the entire exhaust stroke leads to the additional disadvantage that the flow in the intake section is disturbed.

AT 3207 U1 describes a method for performing an internal exhaust gas recirculation into the combustion chamber of an internal combustion engine. In order to enable internal exhaust gas recirculation in the full-load range, an intake valve pre-stroke of at least one intake valve is performed during the exhaust stroke, with the start of the intake valve pre-stroke occurring before 180° crank angle after the upper dead centre of the ignition. If the intake start of the intake valve pre-stroke is defined at such an early time, an internal exhaust gas recirculation occurs at low speed. This is highly undesirable, however, because there will be increased development of smoke due to lack of air.

An air-compressing internal combustion engine is known from DE 1 242 044 C in which in one embodiment the intake valve is opened briefly after the beginning of the exhaust stroke in order to form the preconditions for the formation of a wear-reducing protective layer on the intake valve seats. The wear-reducing protective layer is formed by still lubricating combustion residues. There is no further information in the specification on the opening of the intake valve during the exhaust stroke.

It is the object of the present invention to avoid the aforementioned disadvantages and to improve the emissions in a diesel combustion engine both in the high and low speed ranges.

SUMMARY OF THE INVENTION

This is achieved in accordance with the invention in such a way that the start of the intake valve pre-stroke occurs in the region of 180° to 210° crank angle after the upper dead centre of the ignition. As a result of the positive pressure difference prevailing at this point between the cylinder and the intake stroke during the medium and higher speeds, a part of the exhaust gas escapes into the intake section on opening the valve in the pre-stroke. The quantity depends on the time and the duration of the intake pre-stroke. At low speed, however, the pressure difference between cylinder and intake section is zero or negative at the time of the start of the intake valve stroke, so that no internal exhaust gas recirculation occurs into the intake section. This ensures that on the one hand exhaust gas is recirculated in the medium and high speed range and thus the $NO_x$ emissions are reduced, and that on the other hand the exhaust gas recirculation comes to a standstill in the low speed range and the formation of exhaust particulates is prevented by the adequate supply of fresh air.

Especially favourable conditions for internal exhaust gas recirculation are enabled when the maximum of the intake valve pre-stroke occurs approximately in the region between 200° to 260° crank angle after the upper dead centre of the ignition.

High exhaust gas recirculation rates, especially under full load, can be achieved when the end of the intake valve pre-stroke lies at approximately 240° to 320°, preferably at approximately 270° to 310° after the upper dead centre of the ignition. The precise opening and closing time must be adjusted according to the respective internal combustion engine.

In order to achieve optimal exhaust gas recirculation quantities during full load, it is completely sufficient when the intake valve stroke is at most 20% of the maximum intake valve stroke, preferably at most 10% thereof.

At medium and high speeds, the exhaust gas share mixes in the intake section with the fresh air after the completion of the intake valve stroke and is drawn into the respective cylinder during the next cycle according to ignition order.

Under the mentioned conditions it is possible to achieve sufficient exhaust gas recirculation in the middle and high speed range. The recirculated exhaust gas quantity can preferably be adjusted to one full-load point. There is virtually no exhaust gas recirculation in the low speed range.

Since the intake valve is already completely closed during the exhaust stroke, a calming of the flow in the intake section occurs, so that the intake valve pre-stroke influences the dynamic swirl in the combustion chamber to an only low extent. The valve lap in the upper dead centre of the gas exchange can be designed in a conventional manner in such a way that the lowest possible gas exchange work occurs. The exhaust valve is usually closed after the upper dead centre of the gas exchange. The opening time of the main stroke of the intake valve lies before the upper dead centre of the gas exchange, as is common.

The invention will now explain in greater detail by reference to the attached figure.

DESCRIPTION OF THE FIGURE

The FIGURE shows a valve stroke diagram for the intake valve and exhaust valve entered of an internal combustion engine over the crank angle KW.

DETAILED DESCRIPTION OF THE INVENTION

In the FIGURE, the valve stroke H of the exhaust valve is illustrated by the broken line $H_A$, the stroke H of the intake valve by the line $H_E$. During the upper dead centre of the gas exchange, a conventional slight valve lap between intake stroke $H_E$ and exhaust valve $H_A$ is provided. In the region of the lower dead centre UT after the upper dead centre OTZ of the ignition or before the upper dead centre OT of the gas exchange, a pre-stroke $H_{EV}$ of intake valve is performed according to the present invention, whose maximum $H_{VM}$ is maximally 20%, preferably maximally 10%, of the maximum intake valve stroke $H_E$. The start $H_{VI}$ of the intake pre-stroke $H_{EV}$ lies in the range of 180° to 210° after the upper dead centre OTZ of the ignition. The maximum opening of the intake valve occurs in the region between 200° to 260° crank angle after the upper dead centre OTZ of the ignition.

The end of the intake valve pre-stroke lies in the region of 240° to 320°, preferably close to approximately 270° to 310°, after the dead centre OTZ of the ignition.

During the intake valve pre-stroke $H_{EV}$, there is a positive pressure difference between the cylinder and the intake section in the medium and upper speed range, as a result of which a part of the exhaust gas flows into the intake section during the opening of the intake valve in the pre-stroke. The quantity depends on the time and the duration of the intake valve pre-stroke $H_{EV}$, and represents an optimization criterion for the internal combustion engine. The exhaust gas portion mixes in the intake section with the fresh air after the termination of the intake valve pre-stroke $H_{EV}$ and is drawn into the respective cylinder during the next cycle according to the ignition order. The $NO_X$ emission of the internal combustion engine can be reduced in this way to the required amount.

During the intake valve pre-stroke $H_{EV}$ in the low speed range, there is no or a negative pressure difference between cylinder and intake section, so that no exhaust gas is recirculated internally.

As a result of the intake valve pre-stroke $H_{EV}$ in the region of between 180° and 210° crank angle after the upper dead centre of the ignition, exhaust gas recirculation is suppressed in the low speed range, in the medium and high speed range however, it is enabled. A reduction of the emissions is thus enabled both in the low as well as the medium and high speed range. Since the intake valve is only opened at the beginning of the exhaust valve stroke $H_A$ and is then closed again completely, a calming of the flow in the intake section occurs after the closure of the intake valve, so that the dynamic swirl is disturbed with only little influence during the following intake phase.

The invention claimed is:

1. A method for performing an internal exhaust gas recirculation into a combustion chamber of an internal combustion engine comprising the step of performing an intake valve pre-stroke of at least one intake valve during an exhaust cycle, wherein the start of the intake valve pre-stroke occurs in a region of 180° to 210° crank angle after an upper dead centre of an ignition, and wherein a maximum of the intake valve pre-stroke occurs approximately in a region of between 200° to 260° crank angle after the upper dead centre of the ignition.

2. A method according to claim 1, wherein the end of an intake valve pre-stroke occurs at approximately 240° to 320° after the upper dead centre of the ignition.

3. A method according to claim 1, wherein an end of the intake valve pre-stroke occurs at approximately 270° to 310° after the upper dead centre of the ignition.

4. A method according to claim 1, wherein the intake valve pre-stroke is a maximum of 20% of a maximum intake valve stroke.

5. A method according to claim 1, wherein the intake valve pre-stroke is a maximum of 10% of a maximum intake valve stroke.

6. A method for performing an internal exhaust gas recirculation into a combustion chamber of an internal combustion engine comprising the step of performing an intake valve pre-stroke of at least one intake valve during an exhaust cycle, wherein the start of the intake valve pre-stroke occurs in a region of 180° to 210° crank angle after an upper dead centre of an ignition, wherein the end of the intake valve pre-stroke occurs at approximately 240° to 320° after the upper dead centre of the ignition, and wherein the intake valve is closed completely at the end of the pre-stroke.

7. A method according to claim 6, wherein a maximum of the intake valve pre-stroke occurs approximately in a region of between 200° to 260° crank angle after the upper dead centre of the ignition.

8. A method according to claim 6, wherein an end of the intake valve pre-stroke occurs at approximately 270° to 310° after the upper dead centre of the ignition.

9. A method according to claim 6, wherein the intake valve pre-stroke is a maximum of 20% of a maximum intake valve stroke.

10. A method according to claim 6, wherein the intake valve pre-stroke is a maximum of 10% of a maximum intake valve stroke.

* * * * *